US010125413B2

(12) United States Patent
Krogerus et al.

(10) Patent No.: US 10,125,413 B2
(45) Date of Patent: Nov. 13, 2018

(54) METHOD FOR PRODUCING MANGANESE CONTAINING FERROALLOY

(71) Applicant: OUTOTEC (FINLAND) OY, Espoo (FI)

(72) Inventors: Helge Krogerus, Pori (FI); Pasi Mäkelä, Pori (FI); Visa Kivinen, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 136 days.

(21) Appl. No.: 15/104,500

(22) PCT Filed: Dec. 16, 2014

(86) PCT No.: PCT/FI2014/051014
§ 371 (c)(1),
(2) Date: Jun. 14, 2016

(87) PCT Pub. No.: WO2015/092138
PCT Pub. Date: Jun. 25, 2015

(65) Prior Publication Data
US 2016/0312343 A1    Oct. 27, 2016

(30) Foreign Application Priority Data
Dec. 17, 2013  (FI) ..................................... 20136275

(51) Int. Cl.
| | |
|---|---|
| *C22B 1/20* | (2006.01) |
| *C22B 9/20* | (2006.01) |
| *C21C 5/00* | (2006.01) |
| *C22C 1/02* | (2006.01) |
| *C22C 35/00* | (2006.01) |
| *C22C 27/06* | (2006.01) |
| *C22C 30/00* | (2006.01) |
| *C21C 5/52* | (2006.01) |
| *C21C 7/00* | (2006.01) |
| *C22B 9/10* | (2006.01) |
| *C22C 38/38* | (2006.01) |

(52) U.S. Cl.
CPC .......... *C22C 35/005* (2013.01); *C21C 5/5211* (2013.01); *C21C 5/5229* (2013.01); *C21C 7/0025* (2013.01); *C22B 1/20* (2013.01); *C22B 9/103* (2013.01); *C22B 9/20* (2013.01); *C22C 1/02* (2013.01); *C22C 27/06* (2013.01); *C22C 30/00* (2013.01); *C22C 38/38* (2013.01)

(58) Field of Classification Search
CPC ........... C22B 1/20; C22B 9/20; C22C 35/005; C22C 1/02; C22C 27/06; C22C 30/00; C22C 38/38; C21C 5/5229; C21C 5/5211
See application file for complete search history.

(56) References Cited

U.S. PATENT DOCUMENTS

| | | | | |
|---|---|---|---|---|
| 2,076,885 A | * | 4/1937 | Feild | ......................... C21C 7/00 |
| | | | | 75/10.51 |
| 2,276,287 A | | 3/1942 | Chandler | |
| 2,915,378 A | | 12/1959 | Brennan | |
| 3,495,971 A | * | 2/1970 | Ban | ....................... C22B 1/2406 |
| | | | | 423/138 |
| 3,736,358 A | * | 5/1973 | DeCorso | ................... F27D 3/18 |
| | | | | 373/107 |
| 4,613,363 A | | 9/1986 | Wienert | |
| 6,063,160 A | * | 5/2000 | Krogerus | .................. C22B 1/20 |
| | | | | 264/652 |
| 2003/0047038 A1 | | 3/2003 | Iwasaki et al. | |
| 2010/0126310 A1 | | 5/2010 | Hoffman | |
| 2012/0036960 A1 | * | 2/2012 | Hoffman | ............... C21B 13/006 |
| | | | | 75/10.67 |
| 2012/0103134 A1 | | 5/2012 | Mafra et al. | |
| 2013/0146350 A1 | | 6/2013 | Ku | |

FOREIGN PATENT DOCUMENTS

| | | | | |
|---|---|---|---|---|
| CN | 102864267 A | | 1/2013 | |
| CN | 103 014 327 A | | 4/2013 | |
| GB | 416624 A | * | 9/1934 | ............. C01G 37/14 |
| GB | 805938 A | * | 12/1958 | ............... C22B 1/20 |
| JP | H07-126793 A | | 5/1995 | |

(Continued)

OTHER PUBLICATIONS

Ranawat, P S, and Dr. Veena Sharma. "Manganese Ore." GeologyData. Info, Information Resource Center for Geology Database, Education, & Research, www.geologydata.info/mettalic/manganese.htm. (Year: 2011).*
Gasik et al. Derwent Acc No. 1986-054503 for SU 1171553 A. Machine translation of the description. (Year: 1985).*
Notification of Reasons for Refusal issued by the Japanese Patent Office in corresponding Japanese Patent Application No. 2016-539962 dated May 9, 2017 (7 pages including partial English translation).
International Search Report (PCT/ISA/210) dated Mar. 26, 2015, by the European Patent Office as the International Searching Authority for International Application No. PCT/FI2014/051014.

(Continued)

*Primary Examiner* — George Wyszomierski
*Assistant Examiner* — Tima M McGurthy-Banks
(74) *Attorney, Agent, or Firm* — Buchanan, Ingersoll & Rooney PC

(57) ABSTRACT

To produce manganese containing ferroalloy for steel production, an agglomeration mixture is produced which comprises chromite ore concentrate and manganese ore fines with a grain size smaller than 6-9 mm. The mixture is agglomerated to produce green agglomeration products, such as pellets or other types of agglomerates. The green agglomeration products are sintered in a steel belt sintering furnace to produce either sinter or sintered pellets. The sinter or sintered pellets are smelted in a submerged arc furnace to produce manganese and chromium containing ferroalloy. The ferroalloy produced by the method comprises 6.0-35 w-% manganese and 31-54 w-% chromium.

10 Claims, No Drawings

(56) References Cited

FOREIGN PATENT DOCUMENTS

| | | | |
|---|---|---|---|
| JP | 2011-529133 A | | 12/2011 |
| SU | 570 179 A1 | | 6/1981 |
| SU | 840179 A1 | | 6/1981 |
| SU | 1171553 A | * | 8/1985 |
| SY | 572 526 A1 | | 9/1977 |
| WO | WO 01/18256 A1 | | 3/2001 |
| WO | WO 2009/032110 A1 | | 3/2009 |
| WO | WO 2010/035289 A1 | | 4/2010 |
| WO | WO 2012/172174 A1 | | 12/2012 |
| WO | WO-2012172174 A1 * | 12/2012 | .............. F26B 23/02 |

OTHER PUBLICATIONS

Written Opinion (PCT/ISA/237) dated Mar. 26, 2015, by the European Patent Office as the International Searching Authority for International Application No. PCT/FI2014/051014.

International Preliminary Report on Patentability (CT/IPEA/409) dated Apr. 5, 2016, by the European Patent Office as the International Searching Authority for International Application No. PCT/FI2014/051014.

"Smelting and Melting of Ferroalloys in a Plasma Furnace", Steel Times, Jun. 1, 1988, p. 314, vol. 216, No. 6.

* cited by examiner

METHOD FOR PRODUCING MANGANESE CONTAINING FERROALLOY

FIELD OF THE INVENTION

The invention relates to a method for producing manganese containing ferroalloy for steel production. The invention also relates to a ferroalloy produced by said method.

BACKGROUND OF THE INVENTION

Ferrochrome, ferronickel and other nickeliferous alloys are widely used in steel industry for the production of refined steel. Owing to the high price and low availability of nickel, attempts have been made at least partly to replace nickel with manganese in steelmaking.

Manganese is usually added to the steelmaking process for the final control of the manganese content of steel. The addition can be made, for instance, into an argon oxygen decarburization (AOD) converter in the form of metallic manganese bodies, which have been produced by electrolysis. The operating costs of an electrolytic manganese manufacturing process are very high.

Remarkable amounts of finely divided manganese ore particles are generated in connection with mining, crushing, transportation and handling of manganese ore. Manganese ore fines having a grain size under 6-9 mm cannot be directly used in manganese ore smelting. Ore fines tend to form covers and crusts on top of the charge in an electric furnace. Crust formation can cause gas eruptions, problems in the settling of the charge and extensive disturbances in the smelting operation.

Manganese-containing refined steel can be used as a corrosion resistant metal under less harsh conditions than nickel-containing refined steel. Manganese-containing refined steel can be used, for instance, in the manufacture of kitchen equipment, such as washing stands, food serving apparatus, cutlery, among other things. In this way the costs of the products can be made lower than the costs of corresponding nickel-containing products.

There is a need in the art for a method and a ferroalloy product by means of which the use of manganese as a raw material in steelmaking can be made easier and more cost-effective.

SUMMARY

The method according to the present invention is characterized by what is presented in claim 1.

The method according to the present invention comprises the steps of:
producing an agglomeration mixture comprising chromite ore concentrate and manganese ore fines with a grain size smaller than 6-9 mm,
agglomerating the agglomeration mixture to produce green agglomeration products,
sintering the green agglomeration products in a steel belt sintering furnace to produce sinter or sintered pellets, and
smelting the sinter or sintered pellets in a submerged arc furnace to produce manganese and chromium containing ferroalloy.

In order to make ore fines suitable for feeding into a blast furnace, fine ore particles have to be agglomerated. There are two commercial agglomeration processes in use today: sintering and pelletizing. Sintering is suitable for ore fines of larger particle size, whereas pelletizing is only used for ore fines of small particle size.

In the present invention, manganese ore fines are mixed with chromite ore concentrate to produce an agglomeration mixture. Additives, such as coke and binding agent, are added to the mixture, if appropriate. If the agglomeration process comprises pelletizing, it may be necessary to reduce the particle size in the agglomeration mixture. The agglomeration mixture is processed to produce either green pellets or other types of green agglomeration products, such as micropellets, granules, nodules, etc. The green agglomeration products are sintered to produce either sinter or sintered pellets. Sinter needs to be crushed before further processing. The sintered agglomeration products—sinter or sintered pellets—are finally supplied into a blast furnace to produce ferroalloy.

According to one embodiment of the present invention, manganese ore fines are added to the agglomeration mixture in an amount of 10-40 w-% of the chromite ore concentrate.

According to one embodiment of the present invention, the manganese content of the manganese ore fines is 35-50%.

According to one embodiment of the present invention, the manganese ore fines contain oxidized and/or carbonized ($MnCO_3$) and/or calcite containing manganese ores.

According to one embodiment of the present invention, carbonaceous material, such as metallurgical coke, anthracite or another type of coke, is added to the agglomeration mixture in an amount of 5.0-7.0 w-%. This is especially suitable when producing sinter.

According to another embodiment of the present invention, the method comprises crushing and grounding the manganese ore fines to produce finely divided manganese ore, which is mixed with chromite ore concentrate to produce a pelletizing feed, and the pelletizing feed is pelletized to produce green pellets of a diameter between 6-16 mm.

When producing pellets, bentonite can be added to the pelletizing feed as a binding agent in an amount of 0.5-1.0 w-%. Alternatively any other suitable binding agent can be used.

When producing pellets, the amount of carbonaceous material added to the pelletizing feed is preferably in the range of 0.1-2.0 w-%.

The green pellets or other agglomeration products thus formed are sintered in a steel belt sintering furnace. Finally, the sintered pellets or agglomeration products are smelted in a submerged arc furnace to produce manganese and chromium containing ferroalloy suitable for refined steel production.

According to one embodiment of the present invention, the process temperatures in the sintering furnace are adjusted by means of carbon monoxide received from an electric furnace, natural gas, oil, or any other heat source available.

According to one embodiment of the present invention, the maximal bed temperature in the sintering furnace is 1350-1450° C. The optimal bed temperature depends on the quality of the ore.

Ferroalloy produced by a method according to the present invention comprises 6.0-35 w-% manganese and 31-54 w-% chromium.

The new method for producing manganese bearing ferroalloy for steel production provides an easy and cost-efficient way of introducing manganese into the steelmaking process. The use of manganese ore fines as a manganese source instead of electrolytic manganese reduces significantly the raw material costs of steelmaking. It is also possible to add the manganese containing ferroalloy in a molten state into the steel plant, which saves energy.

DETAILED DESCRIPTION OF THE INVENTION

Manganese ore fines are generated, for instance, in excavation, crushing, screening and washing of manganese ore. The ore typically contains manganese oxides, silicates, carbonates and hydrated components. The volatiles content of manganese ore fines can be up to 20.0%. Some manganese ores may also contain calcites.

According to the present invention, manganese ore fines are mixed with chromite ore concentrate to produce an agglomeration mixture comprising chromite ore concentrate and manganese ore fines with a grain size smaller than 6-9 mm. If necessary, the manganese ore fines and chromite concentrate can be processed, either separately or together, by grinding and screening to produce a pelletizing feed of a desired particle size.

Agglomeration of the manganese-chromite mixture involves either sintering or pelletizing. When producing sinter, the raw materials can be coarser than in the pelletizing process. In general, sinters are porous and brittle, whereas pellets are hard and compact and withstand handling.

Manganese ore can be mixed with the chromite concentrate in an amount of 10-40% of the chromite depending on the quality of manganese ore. The manganese content of the finely ground manganese ore can vary between 35 and 50%.

Carbonaceous material, such as metallurgical coke, anthracite or another type of coke, can be added to the agglomeration mixture. Carbonaceous material acts as an energy source in the sintering bed. When producing sinter, the addition of carbonaceous material can be 5.0-7.0 w-% of the agglomeration mixture. When producing pellets, the amount of carbonaceous material added to the pelletizing feed is smaller, usually in the range of 0.1-2.0 w-%.

When the producing pellets, binding agent, such as bentonite, is added to the pelletizing feed in an amount of 0.5-1.0% of the weight of the pellets. Additionally, a small amount of finely ground coke or any other carboniferous material can be added into the pelletizing feed for use as a heat source during sintering.

Pelletizing can be carried out in a rotary pelletizing drum or on a pelletizing disc. The discharge from the pelletizing device can be screened in a roller screen located under the discharge end of the pelletizing device. Usually, the oversize lumps are crushed and returned together with the screen undersize as a recycling load back to the pelletizing device. Green pellets of a desired size can be dropped on a belt conveyor feeding to the shuttle feeder of a sintering furnace. The size of the green pellets can be 6-18 mm, preferably 8-16 mm.

Sintering of green pellets is preferably carried out in a steel belt sintering furnace. The pellet dust and de-dusting of the sintering plant are preferably re-circulated back to the pelletizing step. A steel belt-type sintering furnace comprises an endless conveyor belt to transport the sintering feed through the subsequent stages of the sintering furnace. The thermal treatment in the sintering furnace comprises the steps of drying, heating, sintering and cooling of the pellets. The sintering furnace is a multi-compartment oven through which the green pellets are carried on a perforated steel conveyor belt. A counter-current flow of cooling gases is arranged to carry waste heat from the sintered pellets to those entering the front-end compartments. Typically, gases are sucked and cooling air blown through wind-boxes located under the conveyor belt. Preferably, sintered pellets are used as a bottom layer on the steel belt to protect it from too high temperatures.

In case sinter is produced, the formed agglomeration products are sintered in the steel belt sintering machine. In this case the agglomeration product is called sinter after it has passed through the steel belt sintering furnace. This sinter is crushed and screened to the different grain sizes. The fraction of 6-75 mm is generally used in the smelter and the fraction of 6-15 mm is used as a protection layer of the steel belt in the sintering furnace. The fraction under 6 mm is re-circulated back to the agglomeration step.

The process temperatures in the sintering furnace can be adjusted by means of carbon monoxide obtained from an electric furnace, natural gas, oil, or any other available fuel according to local conditions. In the sintering furnace the maximal temperature of the pellet bed or agglomerate bed can be maintained in the range of 1350-1450° C. depending on the quality of the ore.

Finally, the sintered pellets or the sinter is smelted in a submerged arc furnace to produce manganese and chromium containing ferroalloy suitable for refined steel production.

Sintered pellets and sinter are strong enough to tolerate their shipping or other kind of transportation from their production site to the final site of use.

The ferroalloy pellets thus produced can be reduced and smelted in a closed submerged electric arc furnace to produce chromium and manganese containing ferroalloy suitable for use as a raw material in refined steel production. Reduction can be carried out with the help of metallurgical coke, anthracite, or any other suitable grade of coke. The smelting charge can be preheated to 600° C. by means of carbon monoxide gas obtained from an electric furnace. The tapping temperature for the molten metal is below 1550° C., whereas the tapping temperature for the molten slag is below 1620° C.

The manganese content of the manganese and chromium containing ferroalloy is in the range of 6.0-35%. The chromium content of the ferroalloy is 54-31%. The ferroalloy also contains iron, carbon and silicon.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for producing manganese containing ferroalloy for steel production, comprising the steps of:
    producing an agglomeration mixture comprising chromite ore concentrate and manganese ore fines with a grain size smaller than 9 mm wherein the manganese ore fines are added to the agglomeration mixture in an amount of 10-40 w-% of the chromite ore concentrate,
    agglomerating the agglomeration mixture to produce green agglomeration products,
    sintering the green agglomeration products in a steel belt sintering furnace to produce sintered pellets, and
    smelting the sintered pellets in a submerged arc furnace to produce manganese and chromium containing ferroalloy.

2. A method according to claim 1, wherein the manganese content of the manganese ore fines is 35-50 w-%.

3. A method according to claim 1, wherein the manganese ore fines contain oxidized and/or carbonized ($MnCO_3$) and/or calcite containing manganese ores.

4. A method according to claim 1, wherein process temperatures in the sintering furnace are adjusted by means of carbon monoxide received from an electric furnace, natural gas, oil, or any other heat source available.

5. A method according to claim 1, wherein the agglomeration mixture comprises manganese ore fines with a grain size smaller than 6 mm.

6. A method for producing manganese containing ferroalloy for steel production, comprising the steps of:
producing an agglomeration mixture comprising chromite ore concentrate and manganese ore fines with a grain size smaller than 9 mm,
agglomerating the agglomeration mixture to produce green agglomeration products,
sintering the preen agglomeration products in a steel belt sintering furnace to produce sintered pellets, and
smelting the sintered pellets in a submerged arc furnace to produce manganese and chromium containing ferroalloy,
wherein the manganese ore fines are crushed and ground to produce finely divided manganese ore, which is mixed with the chromite ore concentrate to produce a pelletizing feed, and the pelletizing feed is pelletized to produce green pellets of a diameter between 6-16 mm.

7. A method according to claim 6, wherein bentonite is added to the pelletizing feed as a binding agent in an amount of 0.5-1.0 w-%.

8. A method according to claim 6, wherein carbonaceous material is added to the pelletizing feed in an amount of 0.1-2.0 w-%.

9. A method according to claim 8, wherein the carbonaceous material is selected from the group consisting of metallurgical coke, anthracite and another type of coke.

10. A method for producing manganese containing ferroalloy for steel production, comprising the steps of:
producing an agglomeration mixture comprising chromite ore concentrate and manganese ore fines with a grain size smaller than 9 mm,
agglomerating the agglomeration mixture to produce green agglomeration products,
sintering the preen agglomeration products in a steel belt sintering furnace to produce sintered pellets, and
smelting the sintered pellets in a submerged arc furnace to produce manganese and chromium containing ferroalloy, wherein the maximal bed temperature in the sintering furnace is 1350-1450° C. depending on the ore quality.

\* \* \* \* \*